United States Patent [19]

Strand

[11] 4,069,809

[45] Jan. 24, 1978

[54] SOLAR HEAT COLLECTING POROUS BUILDING BLOCKS

[76] Inventor: Lyle L. Strand, 2606 Fremont St., Marshalltown, Iowa 50158

[21] Appl. No.: 706,796

[22] Filed: July 19, 1976

[51] Int. Cl.$^2$ .......................... F24J 3/02; F24D 3/00; E04B 5/04

[52] U.S. Cl. .................................. 126/270; 237/1 A; 52/606; 52/612

[58] Field of Search ............... 126/270, 271; 237/1 A; 52/606, 612; 106/40 R, 67

[56] References Cited

U.S. PATENT DOCUMENTS

| | | | |
|---|---|---|---|
| 246,626 | 9/1881 | Morse | 126/270 |
| 2,179,862 | 11/1939 | Rolph | 237/1 A X |
| 2,179,863 | 11/1939 | Rolph | 237/1 A X |
| 2,425,797 | 8/1947 | Gillespie | 237/1 A |
| 2,601,905 | 7/1952 | Anderegg | 126/270 X |
| 3,247,633 | 4/1966 | Schultz et al. | 52/606 X |
| 3,863,621 | 2/1975 | Schenfelder | 126/270 |

OTHER PUBLICATIONS

A Dictionary of Mining, Mineral and Related Terms, p. 531, U.S. Department of Interior, 1968.

Primary Examiner—William F. O'Dea
Assistant Examiner—Larry Jones
Attorney, Agent, or Firm—Zarley, McKee, Thomte, Voorhees & Sease

[57] ABSTRACT

A solar heat collecting building block, having top, bottom, front, back and side surfaces, the block having at least one vertical passage extending therethrough from the bottom surface to the top surface, the top surface having an upper portion which protrudes above the plane of the top surface, the bottom surface having a recessed portion for mating receipt of the upper portion of another block, the front surface of the block having at least one transparent member embedded therein to allow solar rays to pass therethrough and strike the interior portions of said block and heat the same.

13 Claims, 4 Drawing Figures

U.S. Patent  Jan. 24, 1978  4,069,809
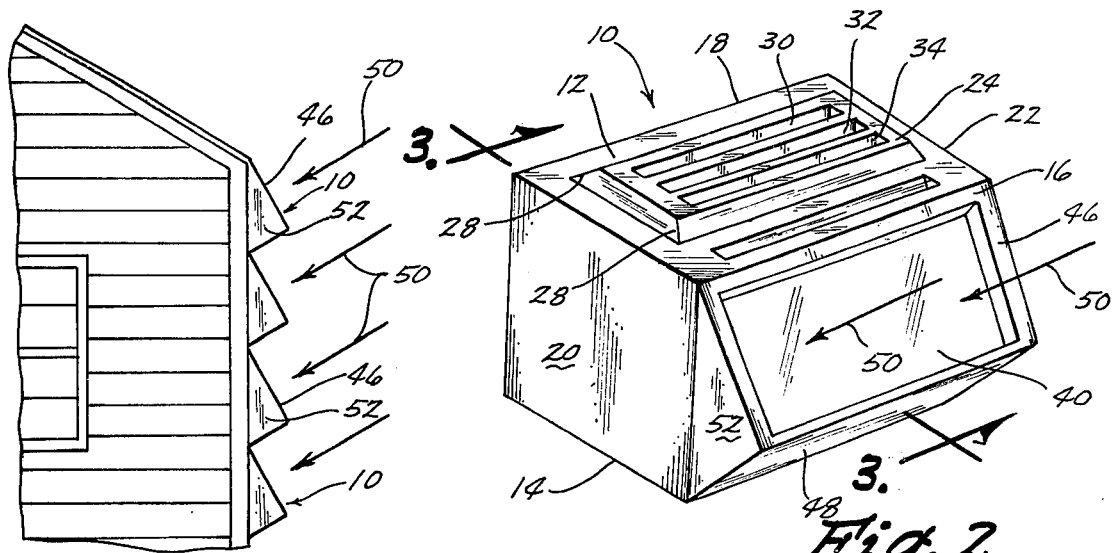
Fig. 1
Fig. 2
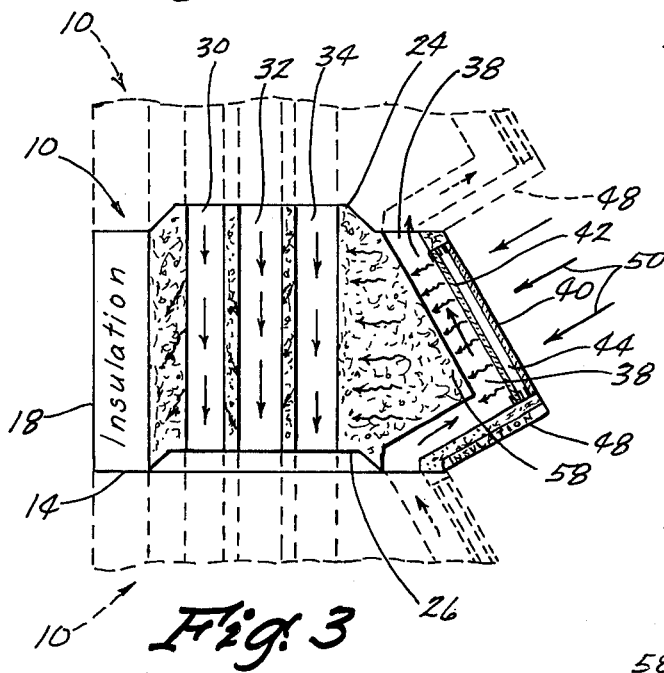
Fig. 3
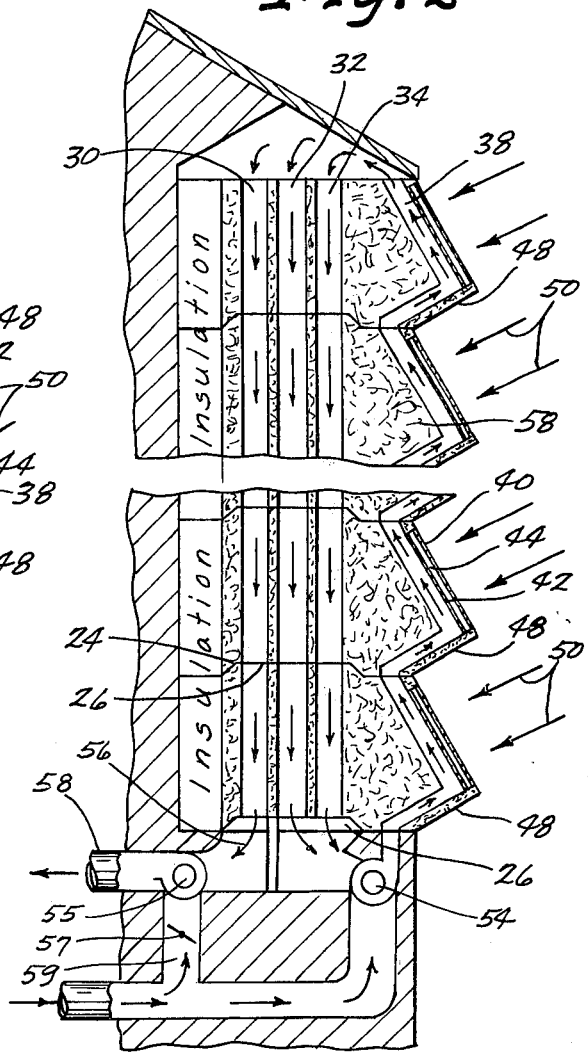
Fig. 4

SOLAR HEAT COLLECTING POROUS BUILDING BLOCKS

BACKGROUND OF THE INVENTION

The recent public awareness of energy shortages and of the finite quantity of energy availble in this country in the form of oil and the like, has increased the interest in solar heating devices. This invention relates to a solar heating device which can be installed on an existing home. Additionally, the invention relates to a solar heating device which can be installed upon a wall of an existing building or home, traditionally a south facing wall with the attendant advantage that it is not subjected to weather damage by hail or the like as would be a roof mounted collecting system. Additionally, another advantage of the system of this invention is that heat can be picked up at any level along the wall and delivered conveniently to adjacent rooms. Yet another important advantage of this invention is that the wall is comprised of a series of precast blocks which are made before hand and can be pre-assembled so that at the job site it is only necessary to form a tier of the blocks along the desired building wall. This substantially eliminates much of the work at a construction job site and much of the expense.

A still further important advantage of the system of this invention is that it is a hot air system, and does not depend upon a separate heat sink as is common with most hot air systems. Rather, the system of this invention is self-contained in that the solar collector and the heat sink are all part and parcel of the same package, namely, the solar heat collecting building blocks. Thus, the system is substantially maintenance free, because of the rugged nature of the building blocks, is subject to easy installation and in all probability involves lower cost than most available systems.

BRIEF DESCRIPTION OF THE DRAWINGS

FIG. 1 is a fragmentary view of a completed building structure showing the solar block wall in an installed position with sun rays hitting the solar surfaces.

FIG. 2 is a perspective view of one of the solar blocks of this invention.

FIG. 3 is a sectional view along line 3—3 of FIG. 2.

FIG. 4 is a longitudinal section through a solar wall comprising a plurality of the blocks of FIG. 2 as it would be mounted on a south facing wall of a home.

DETAILED DESCRIPTION OF THE INVENTION

The solar block, referred to generally as 10, of this invention, is preferably a precast block and may be concrete block or a lighter weight porous Haydite block. Preferably the block is a Haydite block. It may, however, also be a cinder block or a block comprised of other well known porous construction materials. The block when it is precast is, however, colored to be a dark light absorbing color.

Block 10 has a top surface 12, bottom surface 14, a front surface 16, a back surface 18, and opposing side surfaces 20 and 22. The top surface has an upper portion 24 which dwells in a plane generally above the plane of top surface 12. As best seen in FIGS. 3 and 4, the bottom surface has a recessed portion 26 which dwells in a plane recessed from the general plane of bottom surface 14. The dimensions of upper portion 24 and recessed portion 26 are such that upper portion 24 may be matingly received in recessed portion 26 in a nesting relationship so that blocks 10 may be stacked one upon the other and held in place by the shoulders 28 of upper portion 24.

A plurality of elongated, parallel hot air moving passages 30, 32 and 34 extend vertically through the blocks 10 generally from upper portion 24 through recessed portion 26. Thus, when the blocks are stacked in a tier such as shown in FIG. 4, a continuous air moving passage extends via passages 30, 32 and 34 through the entire block wall system.

As best seen in FIGS. 3 and 4, immediately adjacent the back surface 18 of block 10 is a layer of insulation 36. Insulation layer 36 is, of course, to prevent premature escaping of heat from the system without its movement into the building interior.

In addition to the elongated hot air moving passages 30, 32 and 34, the blocks 10 also hve an elongated hot air collecting passage 38 which extends from the top surface 18 to the bottom surface 14 adjacent to transparent members, hereinafter described, of the front surface 16.

The front wall surface 16 gas embedded therein an exteriorially exposed transparent member 40 and spaced apart and immediately therebehind an interiorally disposed transparent member 42, a dead air space 44 is defined between members 40 and 42, and acts as an insulating barrier to prevent escape of hot air outwardly back into the atmosphere. Hot air collecting passage 38 is immediately behind and adjacent to interior transparent member 42.

Front surface 16 is comprised of a downwardly and outwardly protruding face 46 and an inwardly extending face 48. The angle formed at the adjoining portions of protruding face 46 and inwardly extending face 48 is approximately 90°. As shown in FIG. 3 insulation preferably covers face 48 to prevent heat loss. Transparent members 40 and 42 are embedded in protruding face 46. Thus, the angle of transparent members 40 and 42 with respect to the top and bottom surfaces 12 and 14 is approximately 60°, and as a result the solar rays 50 will generally strike perpendicular to transparent member 40. As best depicted in FIG. 2, sides 20 and 22, have an extended side portion 52 which joins downwardly and outwardly protruding face 46 and inwardly extending face 48.

As seen in FIGS. 3 and 4, all portions of the block not specifically described as passages herein, are comprised of a porous heat sink material which has the capability of absorbing heat rays and warming the concrete block. Of course, the top block in a tier as well as the bottom block in a tier is an end sealing block and seals off the solar collecting wall formed by the tier of blocks in order to prevent escape of heated air to the atmosphere. It also seals the hot air collecting passages from the moving air passages.

In actual operation, the wall system has an associated blower means 54 which can force hot air into hot air collecting passage 38 and downwardly through hot air moving passages 30, 32 and 34. Cooler air will be warmed by the heat sink capacity of the blocks 10. The hot air may be depicted by arrows 56 and be directed into the interior portion of the building structure for heating on demand by blower 55. Damper 57 may be employed to provide a mixture of hot and cool air.

In actual operation the wall system works in the following manner: precast blocks comprised of a dark colored heat sink material such as Haydite, 10 are moved to the construction site. They are stacked in a tier as depicted in FIG. 4 and cemented together to form typically a south facing wall for the home. An associated blowers 54 and 55 and associated hot air moving conduit 58 are employed as depicted in FIG. 4. Solar rays 50 strike the exteriorally exposed transparent membe 40, pass therethrough and strike interiorally exposed transparent member 44, pass therethrough wherein they hit the heat collecting surface 58 and warm the block 10 which functions as a heat sink. The space 44 acts as an insulating barrier to prevent outward escape of heat. The heated air in passage 38 is moved therethrough by associated blower 54 and passes downwardly through elongated passages 32 and 34, which as heretofore mentioned, functions as a heat sink. The warmed air is swept away as indicated by arrows 56 via blower 55 and conduit 58 for interior heating of the building structure. Cool air may be mixed with hot air via damper 57 in connecting passage 59. Insulation layer 36 prevents premature escaping of the heated air or of heat from the heated block itself. At night after the sun has gone down, the wall system continues to heat because the individual blocks 10 forming the tier of blocks are still warm and still continue to give off heat into the air which is being swet through passage 38 and passages 30, 32 and 34.

As can be seen, an efficient solar collection system has been provided which accomplishes all of the objects stated herein.

What is claimed is:

1. A solar heat collecting building block comprising a cast block of porous heat sink material having top, bottom, front, back and side surfaces,
    said block having at least one vertical passage extending therethrough from said bottom surface to said top surface,
    said top surface having an upper portion which dwells generally above the plane of said top surface,
    said bottom surface having a recessed portion which dwells in a plane recessed from the plane of said bottom surface,
    said upper portion of one block being capable of matingly being received in said recessed portion of another block,
    said front surface having at least one transparent member embedded therein to allow solar rays to pass therethrough and strike interior portions of said block.

2. The block of claim 1 wherein said block has a plurality of vertical passages.

3. The block of claim 1 wherein said block is a concrete block.

4. The block of claim 1 wherein said block is a porous Haydite block.

5. The block of claim 1 wherein said block has adjacent said back wall, a layer of insulation material.

6. The building wall of claim 1 wherein said blocks are a dark, heat absorbing color.

7. The block of claim 2 wherein said vertical passages extend from the recessed area of said bottom surface through the upper portion of said top surface.

8. The block of claim 2 wherein said block includes a hot air collecting passage, just behind and adjacent to said transparent member.

9. The block of claim 8 wherein a first transparent member has spaced apart and immediately behind it, a second transparent member, said hot air collecting passage being just behind said second transparent member.

10. A building wall formed of a plurality of the cast blocks of claim 8 stacked in a tier, said vertical passages of each block being in intercommunication with said vertical passages of other blocks of the same tier, said hot air collecting passage of each block being in intercommunication with said hot air collecting passages of other blocks of the same tier, means connecting said air collecting passage of the top block of said tier to said vertical passages of said top block such that said hot air collecting passages are in intercommunication with said vertical passages, and means to move air into and through said hot air collecting passages and through and out of said vertical passages.

11. The block of claim 9 wherein said front surface is comprised of first and second faces, said first face being downwardly and outwardly protruding from said top surface and said second face being upwardly and outwardly protruding from said bottom surface so as to meet said first face at approximately a 90° angle, with said first face having said transparent member.

12. The block of claim 11 wherein the angle between said first and second transparent members and said top and bottom surfaces is approximately 60° so that solar rays will strike perpendicular to said first and second members.

13. The block of claim 13 wherein said second second face has a layer of insulation material to prevent heat loss.

* * * * *